United States Patent [19]

Le Reverend

[11] Patent Number: 5,821,421
[45] Date of Patent: Oct. 13, 1998

[54] DEVICE FOR MEASURING A FORCE WITH THE AID OF A CAPACITATIVE SENSOR USING CHARGE TRANSFER

[75] Inventor: Rémi Le Reverend, Neuchatel, Switzerland

[73] Assignee: CSEM—Centre Suisse d'Electronique et de microtechnique SA, Neuchatel, Switzerland

[21] Appl. No.: 780,168

[22] Filed: Dec. 26, 1996

[30] Foreign Application Priority Data

Dec. 26, 1995 [FR] France ................................. 95 15476

[51] Int. Cl.$^6$ ................................................. G01P 15/125
[52] U.S. Cl. ...................................... 73/514.32; 73/514.18
[58] Field of Search ........................... 73/514.16, 514.18, 73/514.32, 718, 724, 862.61; 361/280, 283.1

[56] References Cited

U.S. PATENT DOCUMENTS 3,877,313  4/1975  Ferriss ................................. 73/514.18
4,584,885  4/1986  Cadwell .............................. 73/514.18
5,440,939  8/1995  Barny ................................. 73/514.18

FOREIGN PATENT DOCUMENTS 2706038  12/1994  France .
2720510  12/1995  France .

OTHER PUBLICATIONS

"An ASIC for High–resolution Capacitive Microaccelerometers", H. Leuthld and R. Rudolf, Sensors and Actuators, vol. A21–A23 (1990), pp. 278–281 (no month).

*Primary Examiner*—Christine K. Oda

[57] ABSTRACT

There is described a device for delivering an output signal representative of a force by means of a capacitative sensor (1) and of an interface (5, 7, 9A, 12) for transferring charge accumulated on the capacitor ($C_1$ and $C_2$) of the sensor. In order to reduce the influences of the stray resistances impairing the operation of the sensor (1), the capacitors of the latter are precharged during a first operating phase, whereas during a second operating phase this charge is transferred, while the two capacitors of the sensor (1) are short-circuited and brought to the output potential of the interface.

4 Claims, 4 Drawing Sheets

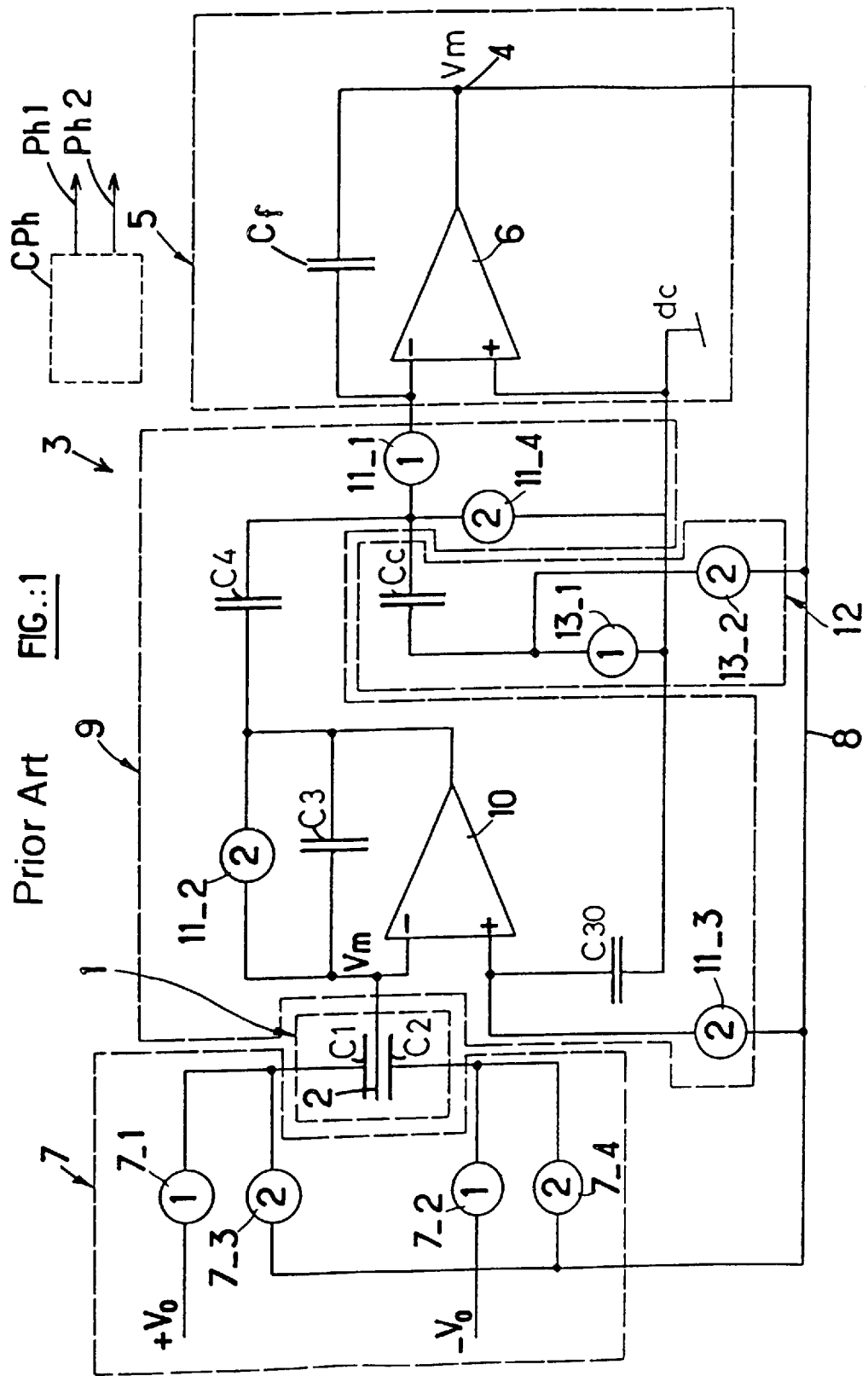
FIG.:1 Prior Art

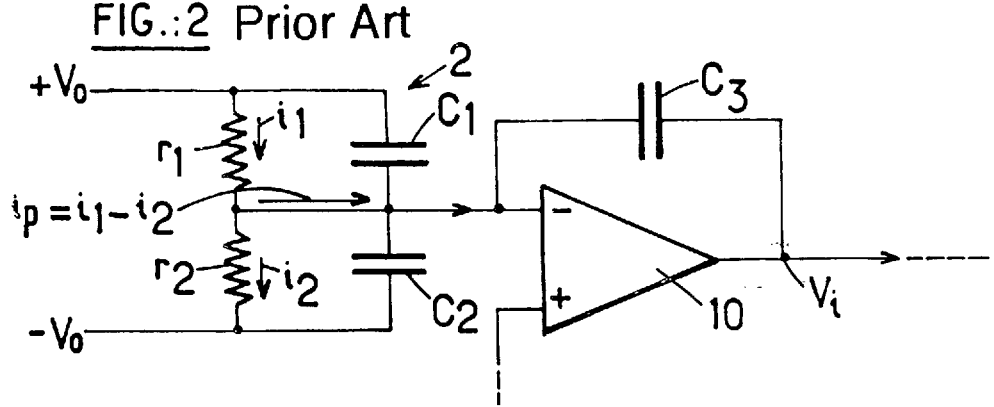
FIG.:2 Prior Art
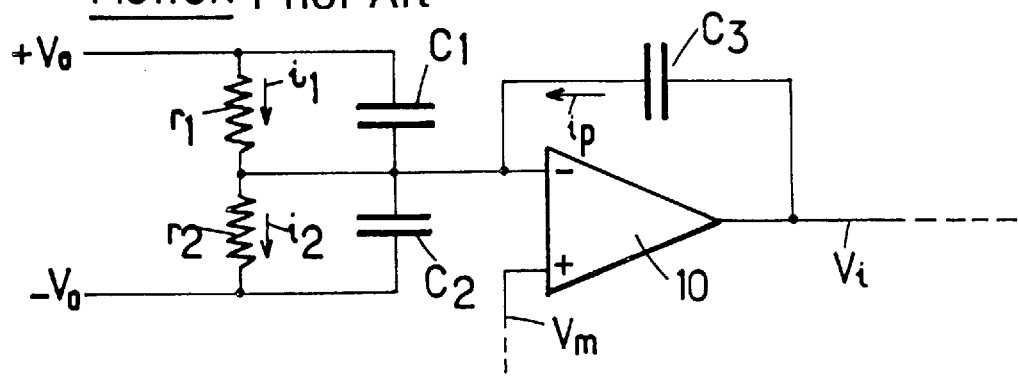
FIG.:3A Prior Art
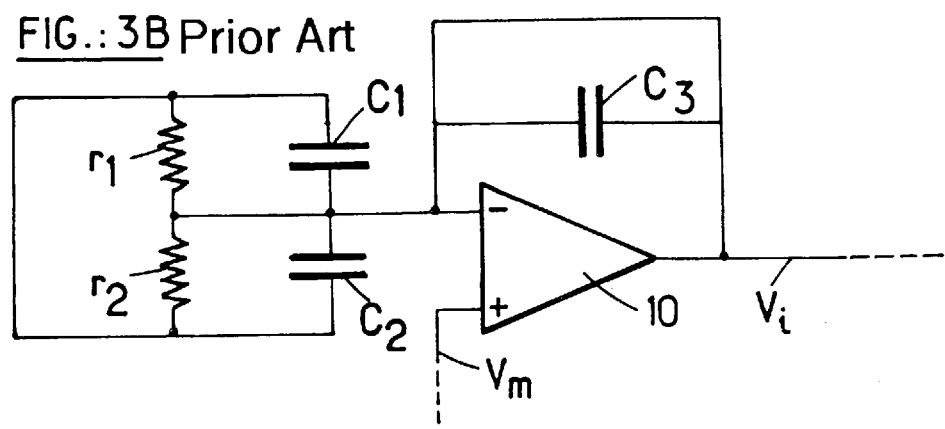
FIG.:3B Prior Art

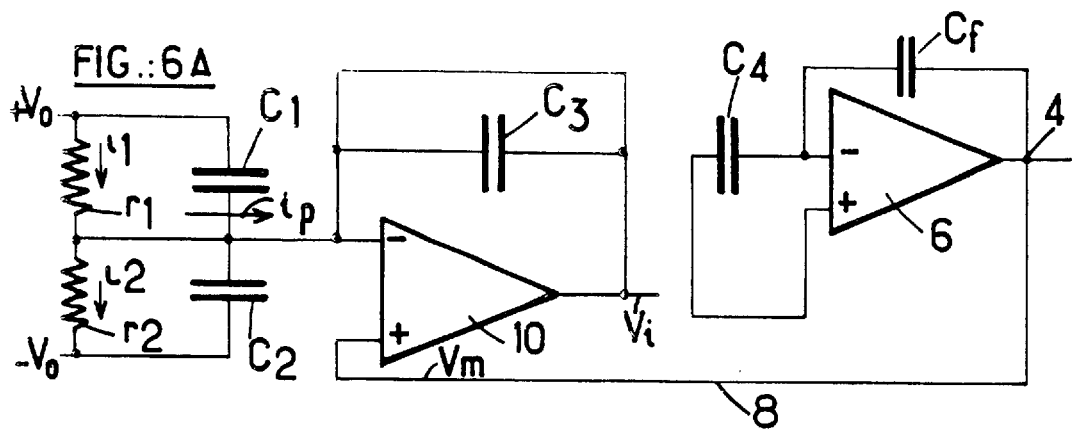
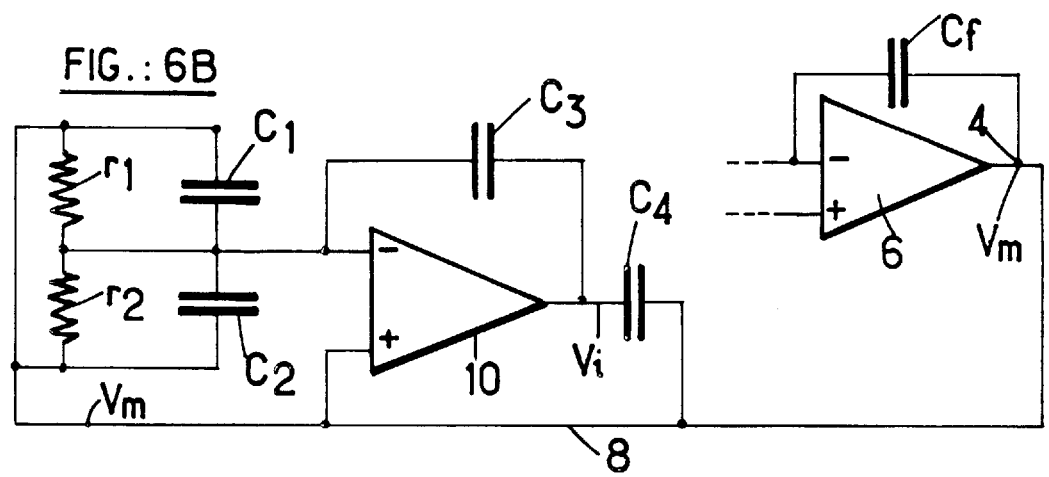
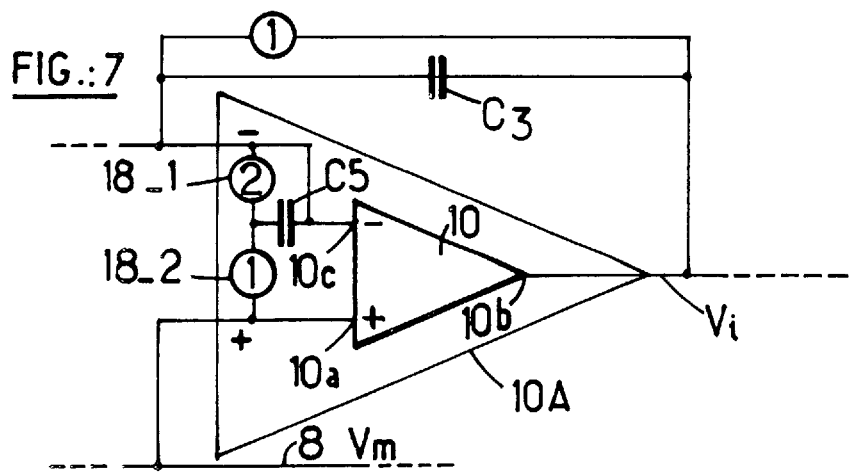

DEVICE FOR MEASURING A FORCE WITH THE AID OF A CAPACITATIVE SENSOR USING CHARGE TRANSFER

FIELD OF THE INVENTION

The present invention relates to a capacitive sensor-based measuring device such as for example a device for measuring a force and especially an inertial force corresponding to an acceleration of the device.

STATE OF THE ART

Such a measuring device has been described in particular in French Patent Application No. 94 06 387 on behalf of the Applicant for the present patent application.

FIG. 1 of the appended drawings represents a diagram of this known measuring device. It essentially includes a capacitive sensor 1 in which an elastically suspended conducting flap 2 forms a plate common to two capacitors $C_1$ and $C_2$. This plate is intended to move under the influence of a force whose intensity is to be measured, this movement causing the capacitances of the two capacitors to vary. The capacitive sensor thus configured is connected to an interface circuit 3 whose output 4 produces a voltage which depends on the capacitances of the two capacitors $C_1$ and $C_2$ and which therefore represents the position of the moveable plate and consequently the sought-after intensity of the force.

The interface circuit 3 continually adjusts the potential of the moveable plate 2, denoted potential $V_m$, in such a way that any flow of charge in this plate is nullified for the measurement. There is therefore a balance of charge, a term which is commonly applied to this kind of measuring device.

The interface circuit 3 comprises an integration block 5 with a capacitor $C_f$ cooperating with an operational amplifier 6. This integration block continually delivers at its output 4 the potential $V_m$ equal to the integral of the charge delivered to its input by the circuit blocks which are connected to it upstream.

The operation of the interface circuit 3 is cyclic in the sense that it is divided into two phases which are repeated continually. These phases are denoted "phase 1" and "phase 2" in the remainder of the description. The gating of these phases is controlled by clock signals which can exhibit a first state $Ph_1$ and a second state $Ph_2$. They are generated by a phase control generator Cph which applies them to switches preferably of the transistorized type. These are closed as the case may be during one of the phases 1 or 2 and open during the opposite phase. In the figures of the appended drawings, these switches are denoted as circles containing a 1 or a 2 depending on whether they are closed during phase 1 or phase 2 respectively under the action of the signals $Ph_1$ and $Ph_2$.

This said, it may be seen that the interface circuit 3 furthermore comprises a switching block 7 which includes switches 7-1 to 7-4 configured in such a way that during phase 1 the fixed plates of the two capacitors $C_1$ and $C_2$ are taken respectively to supply potentials $V_0$ and $-V_0$, whereas during phase 2 these plates and the fixed plate of the capacitors $C_1$ and $C_2$ are at the same potential $V_m$ brought from the output 4 to the switches 7-3 and 7-4 by a connection 8. The supply potentials $V_0$ and $-V_0$ are symmetric with respect to a supply potential dc which serves as reference to the output potential $V_m$.

The interface circuit furthermore comprises a charge transfer block 9 including a so-called "measuring" capacitor $C_3$ and an operational amplifier 10 together forming a charge amplifier, two transfer capacitors $C_{30}$ and $C_4$, as well as switches 11-1 to 11-4, the switch 11-1 being closed during phase 1 and the other three during phase 2.

This interface circuit lastly includes a compensation block 12 intended to bring about a reduction, or even the nullification of the influence of the stray capacitances which are present in the sensor 1. This compensation block comprises a compensation capacitor $C_c$ and switches 13-1 and 13-2 which are closed during phases 1 and 2 respectively.

The operation of this measuring device has been described in detail in the aforesaid patent application and the latter should therefore be referred to in order to ascertain all of the details. It suffices to recall here that the potential $V_m$ takes the form:

$$V_m = \frac{C_1 - C_2 + Cp_1 - Cp_2}{C_1 + C_2 + Cp_1 + Cp_2 - \frac{C_3}{C_4} Cc} V_0 \quad (1)$$

in which the potentials $V_m$ and $V_0$ are respectively those indicated in FIG. 1 and the capacitances $C_1$ and $C_2$ those of the capacitors having identical labels therein, whereas $Cp_1$ and $Cp_2$ are the values of the stray capacitances of the sensor 1.

The arrangement which has just been briefly described above makes it possible to compensate for the effect of the stray capacitances of the sensor 1.

However, it turns out that the presence of the stray capacitances is not the only factor which disturbs the operation of the measuring device and that in compensating for them, another disturbing effect, namely the leakage resistances present across the terminals of the capacitors $C_1$ and $C_2$ of the sensor 1, is not eliminated.

Thus, on considering FIG. 2 of the appended drawings it may be seen that in reality the capacitors $C_1$ and $C_2$ are respectively in parallel with two stray resistances $r_1$ and $r_2$. These resistances can conduct currents $i_1$ and $i_2$ during the measuring phase so that the currents originating from the capacitors $C_1$ and $C_2$ due to their respective charge and conveyed to the integrator formed by the capacitor $C_3$ and the amplifier 10, are increased with a stray current $I_p$. This total current is formed by the difference of the currents $i_1$ and $i_2$ flowing in the resistors $r_1$ and $r_2$ respectively.

This disturbing phenomenon is all the more troublesome since the absolute values of the stray resistances are not known and since they are moreover strongly dependent on temperature, varying in a relatively random manner.

FIGS. 3A and 3B represent partially blocks 7 and 9, as well as the capacitive sensor 1 of FIG. 1, respectively in the precharging or measuring phase 1 and in the phase 2 of resetting or discharging the capacitors. It may be seen that in phase 2 the switches 7-3 and 7-4 short-circuit not only the capacitors of the sensor 1 but also the stray resistances $r_1$ and $r_2$.

It may be shown that by neglecting the stray resistances $r_1$ and $r_2$, the voltage $v_i$ appearing at the output of the amplifier 10 could be written:

$$V_i = V_m - \frac{1}{C_3} \{(C_1 - C_2)V_0 - (C_1 + C_2)V_m\} \quad (2)$$

In fact, the resistances $r_1$ and $r_2$ have the effect of modifying the voltage $V_i$ by a quantity:

$$\Delta V_i = \frac{\frac{(V_0 - V_m)}{r_1} - \frac{(V_m + V_0)}{r_2}}{C_3} T \quad (3)$$

where T is the duration of phase 1.

FIGS. 4A and 4B show partially the block 9 connected to the block 5 during phases 1 and 2 respectively. In phase 1, the capacitor C4 is at the potential $V_i$, whereas during phase 2 this capacitor is at the potential $V_m$, forwarded without modification by the amplifier 10.

The value of $V_m$ thus becomes equal to:

$$V_m = \frac{C_1 - C_2 + \left[\frac{1}{r_1} - \frac{1}{r_2}\right] T + Cp_1 - Cp_2}{C_1 + C_2 - C_3 \frac{C_c}{C_4} = \left[\frac{1}{r_1} + \frac{1}{r_2}\right] T + Cp_1 + Cp_2} V_0 \quad (4)$$

It is found therefore that the result of the measurement is marred by an error due to the presence of the stray resistances.

A first means of reducing this error would consist in reducing the integration time T as much as possible, or in other words, in increasing the sampling frequency clocking the successive executions of phases 1 and 2.

However, such a method would not be advantageous since it would excessively increase the consumption of the measuring device.

Artificially increasing the resistances $r_1$ and $r_2$ could also be contemplated so as to reduce the stray currents $i_1$ and $i_2$ as far as possible (FIG. 2). This method would, however, lead to markedly more complex manufacture of the sensor 2 and consequently a smaller yield from this manufacture.

SUMMARY OF THE INVENTION

The objective of the invention is to afford a solution to the problem of reducing the influence of the stray resistances of a charge balancing sensor without employing the disadvantageous methods mentioned above.

The subject of the invention is therefore a device for measuring a force and especially an inertial force corresponding to an acceleration, comprising:

a capacitive sensor including two capacitors, a first plate of each of said capacitors being linked electrically to the same first connection means, and second plates of said capacitors being linked respectively to second and third connection means, said first plate of at least one of said capacitors furthermore being formed by an elastically suspended movable flap and being able to be subjected to said force in such a way as to vary the capacitance of at least one of said capacitors and, an interface circuit linked to said capacitive sensor so as to deliver an output potential representative of said force and comprising:

integration means responding to electric charge at the input so as to generate, between their output and a source of reference potential, said output potential with a value proportional to the total quantity of said electric charge at the input;

means for delivering at least one periodic control signal exhibiting in succession a first state referred to as the measuring state and a second so-called charge transfer state;

switchable linking means responding to said first state of the control signal so as to take said second plates respectively to a first potential and to a second potential symmetric with said first potential with respect to said reference potential, and also responding to said second state of the control signal so as to bring said second plates to the potential of said output of the integration means; and charge transfer means including charge accumulation means which, during one of said states of said control signal, transfer to said integration means a quantity of charge representative of the charge present on said first plates, and which, during the other of the states of said control signal, are made to discard the charge which they have accumulated previously;

wherein the state during which the charge accumulation means are made to discard their charge is the first so-called measuring state of the control signal, and wherein said charge transfer means also comprise means for reversing the sign of said quantity of charge when the latter is transferred to said integration means.

It follows from these characteristics that the quantity of charge accumulated on the movable plate of the sensor and indicative of a deflection of the movable plate, is measured only by the charge accumulation means of the transfer means, when the capacitors of the sensor are short-circuited for the discarding of the accumulated charge. In this way, during this measurement, the stray currents flowing in the resistances present in parallel with these capacitors cannot influence it. Moreover, as during the other operating state of the device, the capacitors of the sensor accumulate their charge with the aid of the symmetric supply potentials, these resistances are traversed by currents due to these symmetric potentials, but these currents cannot in any case participate in this accumulation. By virtue of the invention, the influence of the stray resistances is therefore totally eliminated.

BRIEF DESCRIPTION OF THE DRAWINGS

Other characteristics and advantages of the invention will emerge in the course of the description which follows, given merely by way of example and with reference to the appended drawings in which:

FIG. 1 is a diagram, already described above, of a capacitive sensor-based force measuring device embodied according to the prior art;

FIG. 2 is a partial diagram of this prior measuring device, in which the presence has been shown of stray resistances which disturb the operation thereof;

FIG. 3A and 3B are partial diagrams of the same prior measuring device when the switches respectively of phase 1 and of phase 2 are closed;

FIGS. 4A and 4B are partial diagrams of another part of the prior measuring device, under the same conditions as FIGS. 3A and 3B;

FIG. 5 is a diagram of a capacitive sensor-based measuring device according to the invention;

FIGS. 6A and 6B show, under the same respective conditions as FIGS. 3A and 3B, a diagram of the measuring device according to the invention;

FIG. 7 is a diagram of one of the operational amplifiers of the measuring device according to the invention, which amplifier is associated with a circuit for compensating its intrinsic offset.

DESCRIPTION OF THE PREFERRED EMBODIMENT

Figures 4A, 4B, 5:
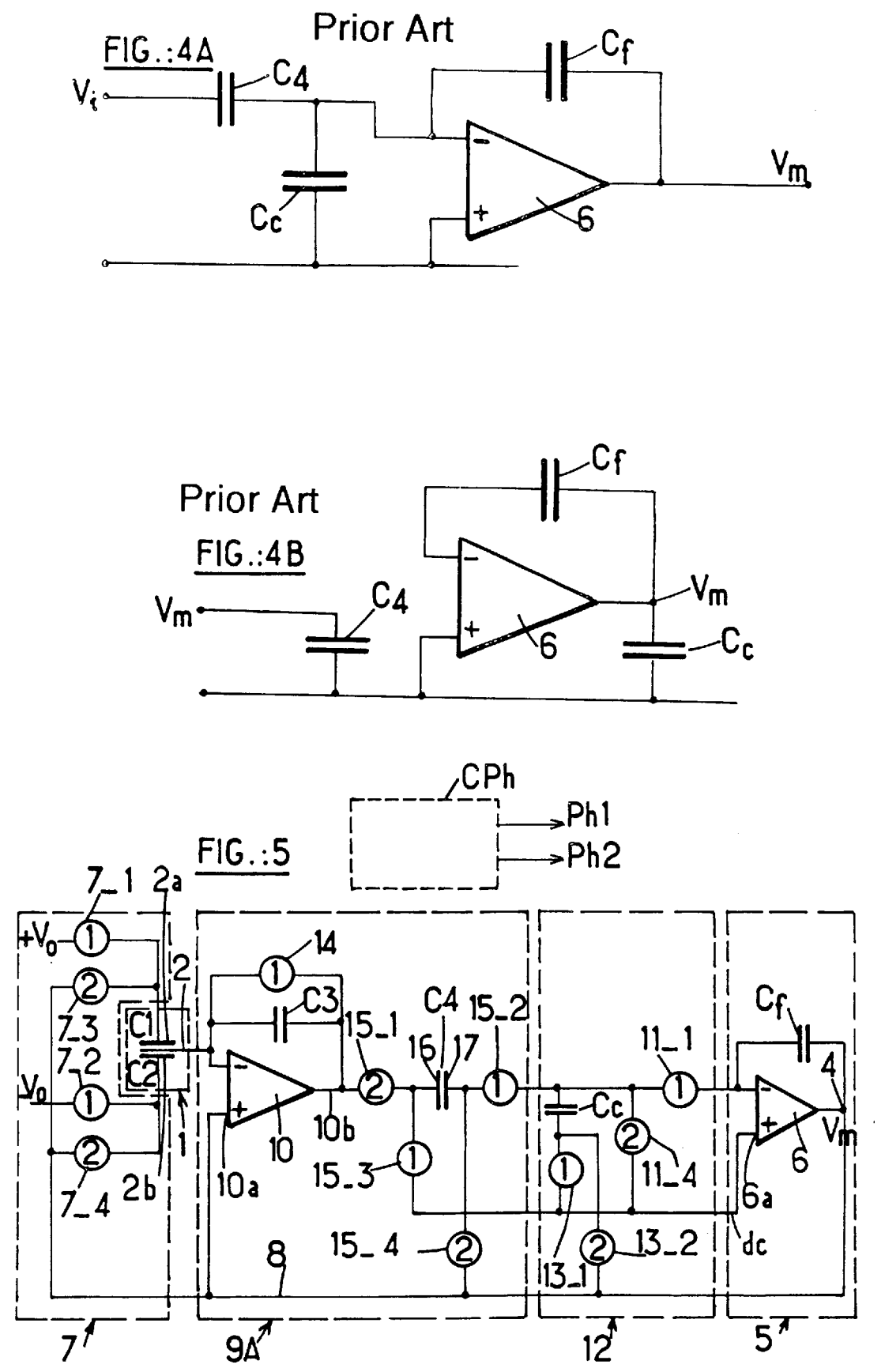

Reference will now be made to FIG. 5 which represents a preferred embodiment of the measuring device according to the invention. The diagram of this device is identical to that of FIG. 1 as regards the switching block 7, the sensor 1, the compensation block 12 and the integration block 5. On the other hand, it differs therefrom according to the invention through the configuration of the charge transfer block here labeled with the reference 9A instead of 9.

This charge transfer block 9A includes the following already-described elements: the measuring capacitor $C_3$, the transfer capacitor $C_4$, the operational amplifier 10 and the generator Cph generating the control signals $Ph_1$ and $Ph_2$. However, these components are mounted differently than in the measuring device according to the prior art.

Thus, it will be noted firstly that the capacitor $C_3$ is connected in parallel with a switch 14 which, unlike in the diagram of FIG. 1, is closed during phase 1 instead of so being during phase 2. Additionally, the noninverting input 10a of the operational amplifier 10 is connected directly to the connection 8 and therefore receives the signal from the output 4 (potential $V_m$) irrespective of which phase the measuring device is in.

It will be noted furthermore that the capacitor $C_4$ is associated with a group of four switches 15-1 to 15-4 connected as follows. Switch 15-1, closed during phase 2, links the output 10b of the amplifier 10 to one of the plates 16 of the capacitor $C_4$. The other plate 17 of this capacitor $C_4$ is linked to the capacitor $C_c$ by way of the switch 15-2 which is closed during phase 1.

The plate 16 of the capacitor C4 is also connected to the switch 15-3 which is closed during phase 1 and which links it during this phase to the noninverting input 6a of the amplifier 6.

The plate 17 is also connected to the switch 15-4 which is closed during phase 2 and which links it to the connection 8 during this phase.

FIGS. 6A and 6B show the measuring device according to the invention during phases 1 and 2 respectively, which for convenience in the description are referred to respectively as the "measuring" and "charge transfer" phases. In order to simplify the figures, the switches and the compensation block 12 are not represented. On the other hand, the connection of the stray resistances $r_1$ and $r_2$ has been shown together with the stray currents $i_1$, $i_2$ and $i_p$ to which they give rise during operation of the measuring device.

According to the invention, the following quantities of charge build up respectively on the capacitors $C_1$, $C_2$ and $C_3$:

During phase 1 (FIG. 6A): $Q_1 = C_1 (V_O - V_m)$
$Q_2 = C_2 (-V_O - V_m)$
$Q_3 = 0$ and during phase 2 (FIG. 6B): $Q_1 = C_1 \cdot 0 = 0$
$Q_2 = C_2 \cdot 0 = 0$
$Q_3 = C_3 \cdot (V_i - V_m)$ These charge equations show that during one of the phases (phase 1 in the example described), the measurement is made by way of the capacitors $C_1$ and $C_2$, while the capacitor $C_3$ is short-circuited. In this way, the charge due to the stray currents $i_1$ and $i_2$ flowing in the resistances $R_1$ and $R_2$ cannot accumulate on the capacitor $C_3$ during the measuring phase and is therefore not taken into account. Additionally, the stray currents are also neutralized during the charge transfer stage (here phase 2) because the stray resistances are then short-circuited (FIG. 6B).

FIG. 6A also shows that during the measuring phase the charge of the capacitor $C_4$ is reset to zero since it is then connected to the input terminals of the amplifier 6 which are at the same potential.

By contrast, as FIG. 6B shows, during the charge transfer phase the capacitor $C_4$ accumulates a quantity of charge $Q_4 = C_4(V_i - V_m)$.

Carrying through a similar calculation to that leading to equation (2), the potential $V_i$ becomes:

$$V_i = V_m + \frac{1}{C_3} \{(C_1 - C_2)V_0 - (C_1 + C_2)V_m\} \quad (5)$$

in which the sign "−" in equation (2) is replaced by the sign "+", whereas, by virtue of the invention, it becomes unnecessary to substract from the value of the potential $V_i$, a value $\Delta V_i$ due to the stray resistances. The latter therefore no longer have any influence on the result of the measurement.

The reversal of sign in equation (5) requires the presence of the switches 15-1 to 15-4 which make it possible to reverse the connections of the capacitor $C_4$, when the setup passes from one phase to the other.

It should be observed that, with the amplifier 10 being connected directly to the connection 8 by its terminal 10a, its intrinsic offset may have an influence on the result of the measurement. It is therefore recommended, according to another characteristic of the invention, to provide a compensation circuit for this offset. FIG. 7 proposes an advantageous embodiment of such a compensation circuit.

In this FIG. 7 it may be seen that the inverting input 10c of the operational amplifier 10 is connected to a compensation capacitor $C_5$ which is connected in parallel with a switch 18-1 which is closed during phase 2. This capacitor is also connected to a switch 18-2 which is closed during phase 1 and connected moreover to the noninverting input of the amplifier 10. The whole forms an offset compensation operational amplifier 10A in which during phase 1 the offset is measured, whereas during phase 2 the value of this offset is subtracted from the potential at the inverting input 10b of the amplifier 10.

It should further be noted that the means described above for eliminating the influence of the stray resistances of the capacitive sensor 1 are not necessarily to be combined with those making it possible to compensate for the influence of the stray capacitances and which are physically embodied by the compensation block 12. If this block is regarded as being unnecessary, the switch 15-2 can be joined directly (FIG. 5) to the inverting input of the operational amplifier 6.

I claim:

1. A device for measuring an inertial force corresponding to an acceleration, comprising:

a capacitive sensor (1) including two capacitors ($C_1$, $C_2$) and first, second and third connection means, a first plate (2) of each of said capacitors being linked electrically to the first connection means, and second plates (2a, 2b) of said capacitors being linked respectively to said second and third connection means, said first plate (2) of at least one of said capacitors furthermore including an elastically suspended movable flap and being able to be subjected to said force in such a way as to vary the capacitance of at least one of said capacitors ($C_1$, $C_2$) and, an interface circuit (5, 7, 9A, 12) linked to said capacitive sensor (1) so as to deliver an output potential ($V_m$) representative of said force and comprising:

integration means (5) responding to electric charge at the input thereof so as to generate, between the output (4) thereof and a source of reference potential (dc), said output potential ($V_m$) with a value proportional to the total quantity of said electric charge at the input;

means ($C_{ph}$) for delivering at least one periodic control signal ($Ph_1$, $Ph_2$) exhibiting in succession a first measuring state and a second charge transfer state;

switchable linking means (7) responding to said first state of the control signal so as to bring said second plates (2a, 2b) respectively to a first potential ($V_0$) and to a second potential ($-V_0$) symmetric with said first potential ($V_0$) with respect to said reference potential (dc), and also responding to said second state of the control signal so as to bring said second plates (2a, 2b) to the potential of said output (4) of the integration means (5); and charge transfer means (9A) including charge accumulation means ($C_3$) which, during one ($Ph_1$) of said states of said control signal, transfers to said integration means (5) a quantity of charge representative of the charge present on said first plate (2), and which, during the other ($Ph_2$) of the states of said control signal, is made to discard the charge which it had accumulated previously; wherein the state during which the charge accumulation means ($C_3$) is made to discard said charge is the first measuring state ($Ph_1$) of the control signal, and wherein said charge transfer means (9A) also comprises means ($C_4$, 15-1 to 15-4) for reversing the sign of said quantity of charge when the latter is transferred to said integration means (5).

2. The device as claimed in claim 1, wherein said charge transfer means (9A) comprises a charge amplifier (10, $C_3$) including an operational amplifier (10) whose inverting input is connected to its output (10b) by way of a measuring capacitor ($C_3$), as well as a transfer capacitor ($C_4$) linking the output of said operational amplifier (10) to said integration means (5), a switching element shunted across said measuring capacitor ($C_3$) for short-circuiting it during said first state ($Ph_1$) of the control signal and a plurality of switching elements connected to said transfer capacitor ($C_4$) for connecting said transfer capacitor to the input terminals of said integration means (5) during the first state ($Ph_1$) of said control signal while isolating it from said charge amplifier (10, $C_3$) of the transfer means (9A), and for connecting it between said output (4) of said integration means (5) and the output (10b) of the charge amplifier of said transfer means (9A) during the second state ($Ph_2$) of said control signal.

3. The device as claimed in claim 2, wherein said transfer means (9A) also includes an offset compensation capacitor ($c_5$) and additional switching elements (18-1, 1802) linking said offset compensation capacitor to the inverting and non-inverting inputs of said operational amplifier (10), during the first state ($Ph_1$) of said control signal and which connect it in series with said measuring capacitor ($C_3$) during the second state ($Ph_2$) of said control signal.

4. The device as claimed in claim 3, furthermore including a compensation circuit element (12) connected between said transfer means (9A) and said integration means (5) so as to compensate for the influence of the inherent stray capacitances of said sensor (1), wherein said charge compensation element comprises a capacitor ($C_c$) which, during the first state ($Ph_1$) of said control signal, is connected in parallel to said transfer capacitor ($C_4$) with a first polarity and which, during the second state ($Ph_2$) of said control signal, is linked in parallel with this transfer capacitor ($C_4$) with the reverse polarity.

* * * * *